US012593149B2

(12) United States Patent
Fujimori et al.

(10) Patent No.: US 12,593,149 B2
(45) Date of Patent: Mar. 31, 2026

(54) PHOTOELECTRIC CONVERSION DEVICE, MOVABLE APPARATUS, CONTROL METHOD, AND STORAGE MEDIUM

(71) Applicant: CANON KABUSHIKI KAISHA, Tokyo (JP)

(72) Inventors: Soya Fujimori, Kanagawa (JP); Takayuki Kimura, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 26 days.

(21) Appl. No.: 18/801,892

(22) Filed: Aug. 13, 2024

(65) Prior Publication Data

US 2025/0088772 A1 Mar. 13, 2025

(30) Foreign Application Priority Data

Sep. 12, 2023 (JP) ................................. 2023-147812

(51) Int. Cl.
*H04N 25/773* (2023.01)
*H04N 23/61* (2023.01)
*H04N 25/583* (2023.01)

(52) U.S. Cl.
CPC ........... *H04N 25/773* (2023.01); *H04N 23/61* (2023.01); *H04N 25/583* (2023.01)

(58) Field of Classification Search
CPC ...... H04N 23/61; H04N 23/611; H04N 23/73; H04N 23/741; H04N 23/743; H04N 25/581; H04N 25/583; H04N 25/773
See application file for complete search history.

(56) References Cited

U.S. PATENT DOCUMENTS

| | | | |
|---|---|---|---|
| 2007/0222877 A1 | 9/2007 | Kurane | |
| 2018/0338102 A1 | 11/2018 | Saito | |

(Continued)

FOREIGN PATENT DOCUMENTS

JP 7223070 B2 2/2023

OTHER PUBLICATIONS

Extended European Search Report issued by the European Patent Office on Dec. 16, 2024 in corresponding EP Patent Application No. 24193258.1.

*Primary Examiner* — Daniel M Pasiewicz
(74) *Attorney, Agent, or Firm* — Carter, DeLuca & Farrell LLP

(57) ABSTRACT

A photoelectric conversion device includes a plurality of pixels each including a photoelectric conversion unit that emits pulses corresponding to photons, a counter that counts the number of the pulses, and a memory that stores a count value of the counter, a control means for generating a signal based on a difference between a count value of the counter at the start of an accumulation period and a count value at the end of the accumulation period and for performing control so that a signal generated in a first accumulation period is output between the end of the first accumulation period and the end of a second accumulation period, wherein one full frame period includes the first accumulation period and the second accumulation period longer than the first accumulation period, and a recognition processing means for performing recognition processing based on an image signal, and for changing a frequency of recognition within the one full frame period based on subject information.

16 Claims, 14 Drawing Sheets

(56) References Cited

U.S. PATENT DOCUMENTS

| 2020/0304745 A1 | 9/2020 | Sato |
| 2022/0166925 A1* | 5/2022 | Nakagawa ................ B60R 1/00 |
| 2022/0400199 A1* | 12/2022 | Numata ................. H04N 23/71 |
| 2024/0402311 A1 | 12/2024 | Kimura |
| 2024/0406574 A1 | 12/2024 | Kimura |
| 2024/0406598 A1 | 12/2024 | Kimura |
| 2024/0430590 A1 | 12/2024 | Fujimori |
| 2024/0430594 A1* | 12/2024 | Ishikawa .............. H04N 23/611 |
| 2025/0008238 A1 | 1/2025 | Kimura |
| 2025/0088761 A1 | 3/2025 | Kimura |

* cited by examiner

STORAGE TIME

FIG. 9

PHOTOELECTRIC CONVERSION DEVICE, MOVABLE APPARATUS, CONTROL METHOD, AND STORAGE MEDIUM

BACKGROUND OF THE INVENTION

Field of the Invention

The present invention relates to a photoelectric conversion device, a movable apparatus, a control method, a storage medium, and the like.

Description of the Related Art

In recent years, photoelectric conversion devices that digitally count the number of photons incident on an avalanche photodiode (APD) and output a counted value as a photoelectrically converted digital signal from a pixel have been developed. For example, Japanese Patent No. 7223070 discloses a configuration in which a photoelectric conversion device including an APD can output a plurality of images whose accumulation periods overlap each other, thereby enabling continuous imaging even under low illuminance.

However, for example, assuming an imaging element for an in-vehicle camera installed on a movable apparatus, recognition processing is performed on a frame-by-frame basis in normal sensor driving, and thus recognition processing can only be performed every 33.3 ms in the case of 30 fps. Thus, even when an object appears immediately after a frame change in the in-vehicle camera, recognition processing cannot be performed until the end of a frame period.

Further, in in-vehicle cameras, an accumulation period is often set to a certain period (11 ms) or more in order to suppress flickering caused by traffic lights, and particularly, a long accumulation period is set under low illuminance to capture bright images. However, subject blurring may occur depending on conditions of a host vehicle or conditions of a subject due to a long accumulation period, and a recognition rate is considered to decrease.

Further, when there is a subject approaching in a moving direction of a host vehicle, it is necessary to pay attention to the subject because there is danger. In this case, frame-by-frame recognition processing may not be frequent enough to confirm conditions of the subject, which may result in a delay in coping with an emergency.

SUMMARY OF THE INVENTION

A photoelectric conversion device according to one aspect of the present invention includes a plurality of pixels each including a photoelectric conversion unit that emits pulses corresponding to photons, a counter that counts the number of the pulses, and a memory that stores a count value of the counter, a control means for generating a signal based on a difference between a count value of the counter at the start of an accumulation period and a count value at the end of the accumulation period and performing control so that a signal generated in a first accumulation period is output between the end of the first accumulation period and the end of a second accumulation period, wherein one full frame period includes the first accumulation period and the second accumulation period longer than the first accumulation period, and a recognition processing means for performing recognition processing based on an image signal, and for changing a frequency of recognition within the one full frame period based on subject information.

Further features of the present invention will become apparent from the following description of embodiments with reference to the attached drawings.

BRIEF DESCRIPTION OF THE DRAWINGS

FIG. 7 is a diagram showing a photoelectric conversion method performed by a camera control unit 605 according to the embodiment.

FIG. 9 is a diagram showing a relationship between memory circuits and buffers in the embodiment.

DESCRIPTION OF THE EMBODIMENTS

Hereinafter, with reference to the accompanying drawings, favorable modes of the present invention will be described using Embodiments. In each diagram, the same reference signs are applied to the same members or elements, and duplicate description will be omitted or simplified.

Figure 1:
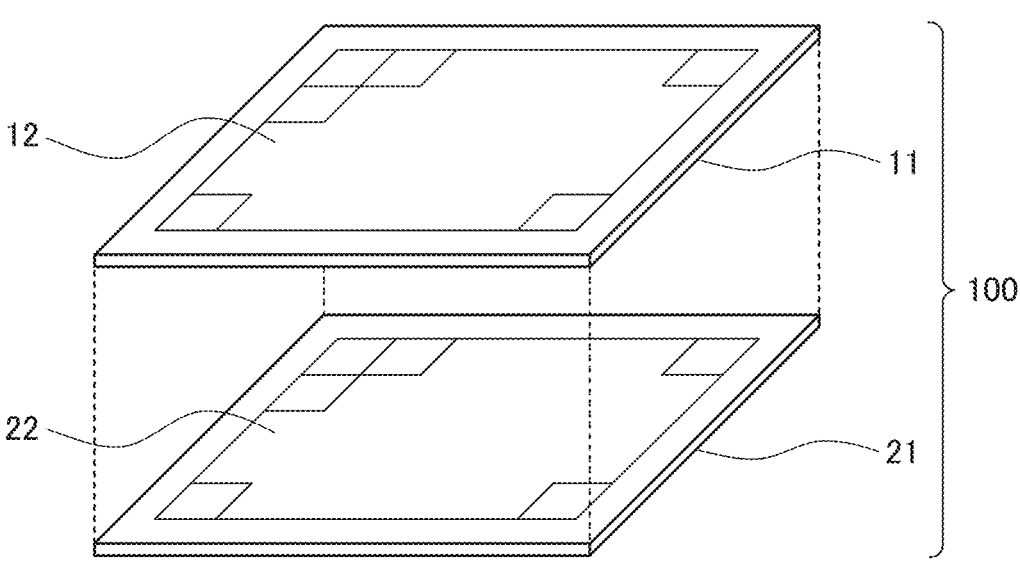
FIG. 1 is a diagram showing a configuration example of a photoelectric conversion element according to an embodiment of the present invention.

FIG. 1 is a diagram showing a configuration example of a photoelectric conversion element according to an embodiment of the present invention. Hereinafter, description will be given of an example of a photoelectric conversion device having a so-called stacked structure in which a photoelectric conversion element 100 is configured by stacking and electrically connecting two substrates, that is, a sensor substrate 11 and a circuit board 21.

However, the photoelectric conversion device may have a so-called non-stacked structure in which components included in a sensor substrate and components included in a circuit board are disposed in a common semiconductor layer. The sensor substrate 11 includes a pixel region 12. The circuit board 21 includes a circuit region 22 that processes signals detected in the pixel region 12.

Figure 2:
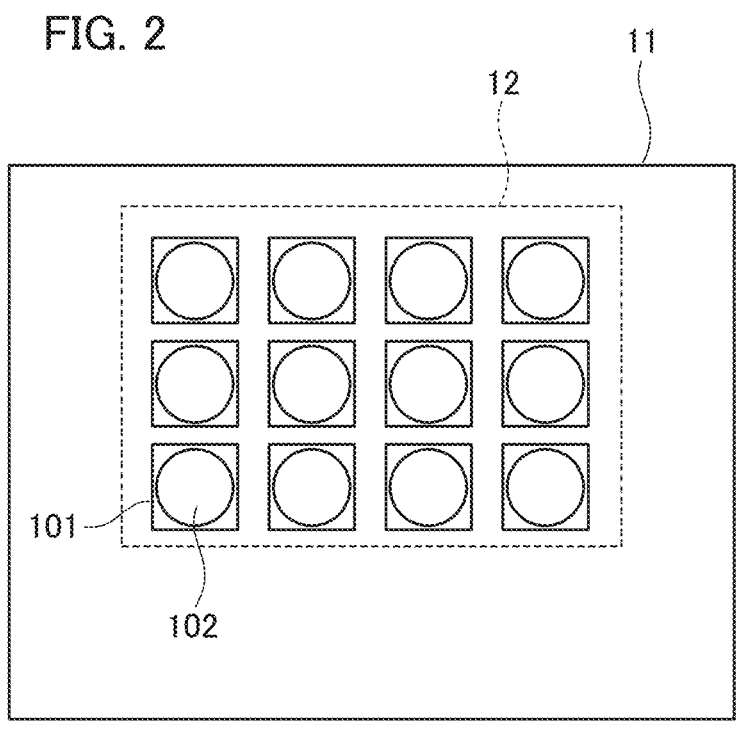
FIG. 2 is a diagram showing a configuration example of a sensor substrate 11.

FIG. 2 is a diagram showing a configuration example of the sensor substrate 11. The pixel region 12 of the sensor substrate 11 includes a plurality of pixels 101 disposed two-dimensionally across a plurality of rows and columns. Each pixel 101 includes a photoelectric conversion unit 102 including an avalanche photodiode (hereinafter, an APD), and the photoelectric conversion unit 102 emits pulses at a frequency corresponding to the frequency of reception of photons. The number of rows and columns of a pixel array forming the pixel region 12 is not particularly limited.

Figure 3:
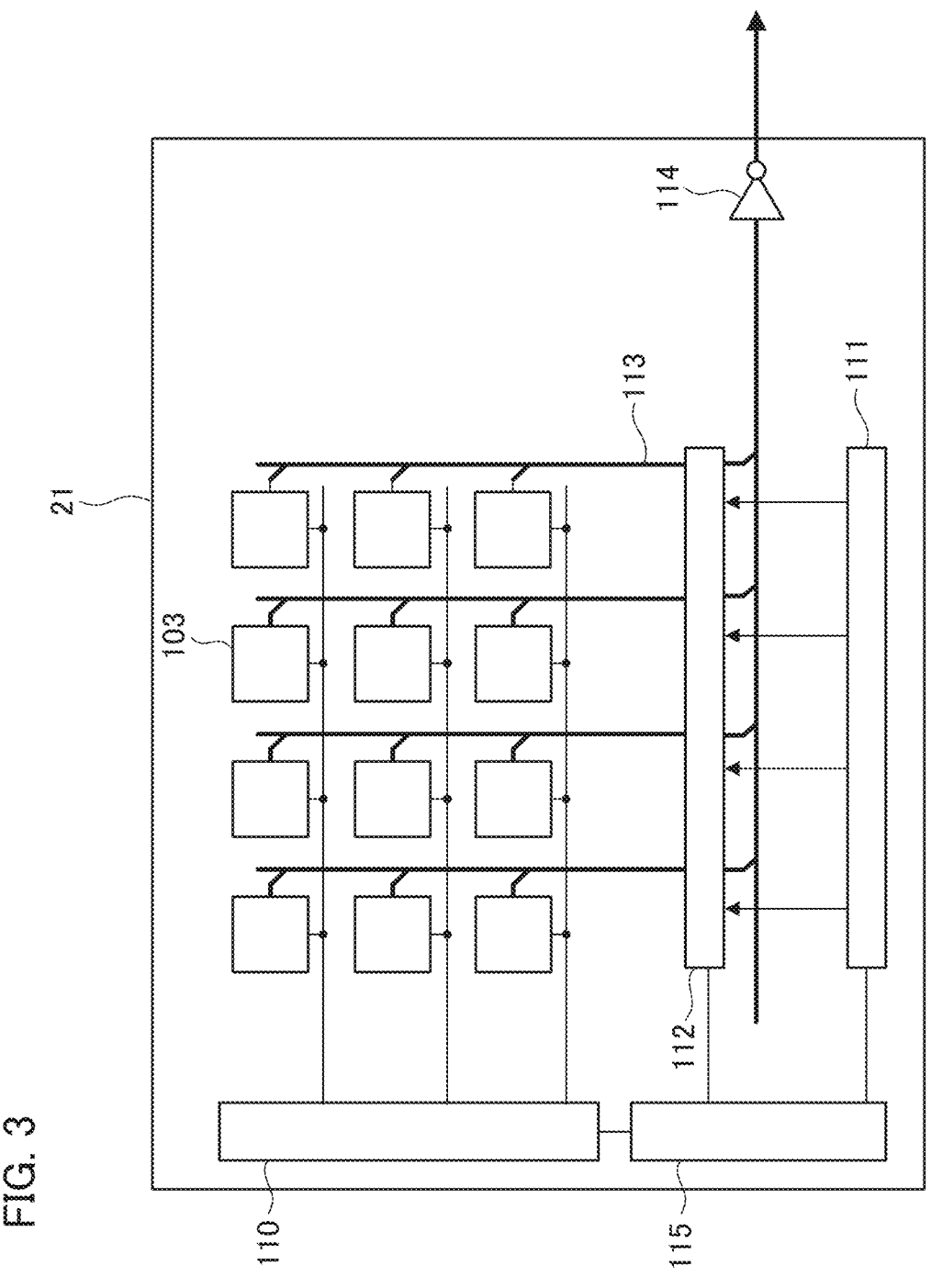
FIG. 3 is a diagram showing a configuration example of a circuit board 21.

FIG. 3 is a diagram showing a configuration example of the circuit board 21. The circuit board 21 includes a signal processing circuit 103 that processes charges photoelectrically converted by each photoelectric conversion unit 102 in FIG. 2, a readout circuit 112, a control pulse generation unit 115, a horizontal scanning circuit 111, a vertical signal line 113, a vertical scanning circuit 110, and an output circuit 114.

The vertical scanning circuit 110 receives a control pulse supplied from the control pulse generation unit 115 and sequentially supplies the control pulse to a plurality of pixels arranged in a row direction. Logic circuits such as a shift register and an address decoder are used as the vertical scanning circuit 110.

A signal output from the photoelectric conversion unit 102 of each pixel is processed by each signal processing circuit 103. The signal processing circuit 103 is provided with a counter, a memory, and the like, and a digital value is stored in the memory. The horizontal scanning circuit 111 inputs a control pulse to the signal processing circuit 103 for sequentially selecting columns in order to read a signal from the memory of each pixel in which a digital signal is stored.

A signal is output from the signal processing circuit 103 of the pixel of the row selected by the vertical scanning circuit 110 to the vertical signal line 113. The signal output to the vertical signal line 113 is output to the outside of the photoelectric conversion element 100 via the readout circuit 112 and the output circuit 114. A plurality of buffers connected to vertical signal lines 113 are built in the readout circuit 112.

As shown in FIGS. 2 and 3, a plurality of signal processing circuits 103 are disposed in a region that overlaps the pixel region 12 in a plan view. The vertical scanning circuit 110, the horizontal scanning circuit 111, the readout circuit 112, the output circuit 114, and the control pulse generation unit 115 are disposed to overlap each other between an edge of the sensor substrate 11 and an edge of the pixel region 12 in a plan view.

That is, the sensor substrate 11 has the pixel region 12 and a non-pixel region disposed around the pixel region 12. In addition, the vertical scanning circuit 110, the horizontal scanning circuit 111, the readout circuit 112, the output circuit 114, and the control pulse generation unit 115 are disposed in a region overlapping the non-pixel region in a plan view.

The arrangement of the vertical signal line 113, the readout circuit 112, and the output circuit 114 is not limited to the example shown in FIG. 3. For example, the vertical signal line 113 may be disposed to extend in the row direction, and the readout circuit 112 may be disposed at the end of the vertical signal line 113 that is extending. In addition, the signal processing circuit 103 does not necessarily need to be provided for each photoelectric conversion unit, and one signal processing unit may be shared by the plurality of photoelectric conversion units to perform signal processing sequentially.

Figure 4:
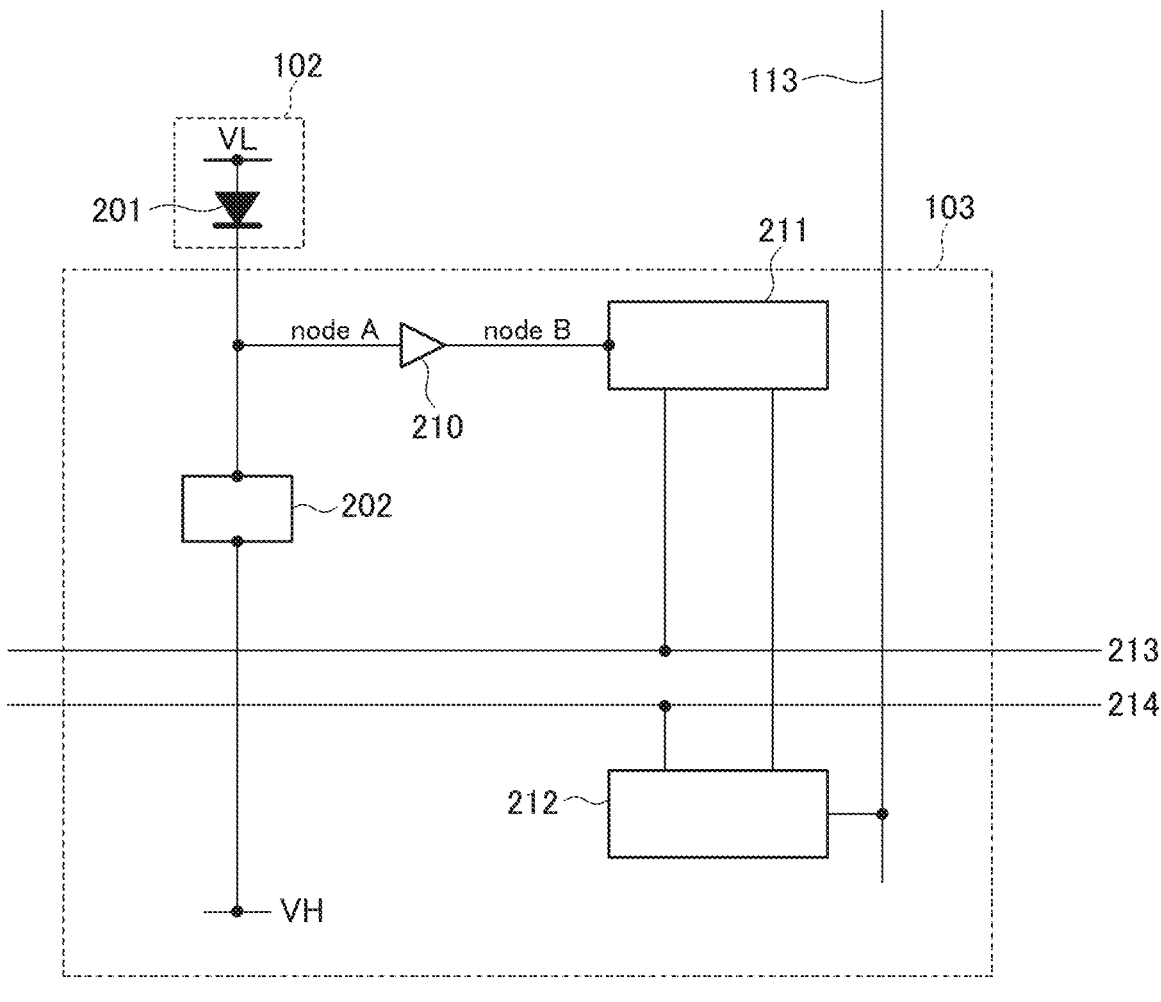
FIG. 4 is a diagram showing an equivalent circuit of a pixel 101 and a signal processing circuit 103 corresponding to the pixel 101 in FIGS. 2 and 3.

FIG. 4 is a diagram showing an equivalent circuit of the pixel 101 in FIG. 2 and FIG. 3 and the signal processing circuit 103 corresponding to the pixel 101.

The APD 201 included in the photoelectric conversion unit 102 generates charge pairs according to incident light by photoelectric conversion. One of two nodes of the APD 201 is connected to a power supply line to which a drive voltage VL (first voltage) is supplied. The other of the two nodes of the APD 201 is connected to a power supply line to which a drive voltage VH (second voltage) higher than the voltage VL is supplied.

In FIG. 4, one node of the APD 201 is an anode, and the other node of the APD is a cathode. A reverse bias voltage is supplied to the anode and the cathode of the APD 201 so that the APD 201 performs an avalanche multiplication operation. By supplying such a voltage, charges generated by the incident light causes avalanche multiplication, and an avalanche current is generated.

When a reverse bias voltage is supplied, there is a Geiger mode in which the anode and the cathode are operated with a voltage difference greater than a breakdown voltage, and a linear mode in which the anode and the cathode are operated with a voltage difference close to or equal to or less than the breakdown voltage. An APD operated in the Geiger mode is referred to as an SPAD. In the case of the SPAD, for example, a drive voltage VL (first voltage) is −30 V, and a drive voltage VH (second voltage) is 1 V.

The signal processing circuit 103 includes a quench element 202, a waveform shaping unit 210, a counter circuit 211, and a memory circuit 212. The quench element 202 is connected to a power supply line to which the drive voltage VH is supplied and to one of the anode and cathode nodes of the APD 201.

The quench element 202 functions as a load circuit (quench circuit) during signal multiplication by avalanche multiplication and has a function of suppressing a voltage to be supplied to the APD 201 and suppressing avalanche multiplication (quench operation). The quench element 202 also has a function of returning the voltage to be supplied to the APD 201 to the drive voltage VH by applying a current equivalent to a voltage drop caused by the quench operation (recharge operation).

FIG. 4 shows an example in which the signal processing circuit 103 includes the waveform shaping unit 210, the counter circuit 211, and the memory circuit 212 in addition to the quench element 202.

The waveform shaping unit 210 shapes a voltage change of the cathode of the APD 201 obtained when detecting photons, and outputs a pulse signal. For example, an inverter circuit is used as the waveform shaping unit 210. FIG. 4 shows an example in which one inverter is used as the waveform shaping unit 210, but a circuit in which a plurality of inverters are connected in series or other circuits having a waveform shaping effect may be used.

The counter circuit 211 counts the number of pulses output from the waveform shaping unit 210 and stores a count value. In addition, when a control pulse RES is supplied via the drive line 213, a signal stored in the counter circuit 211 is reset. Here, the counter circuit 211 generates a signal based on a difference between a count value at the start of an accumulation period and a count value at the end of the accumulation period.

A control pulse SEL is supplied to the memory circuit 212 from the vertical scanning circuit 110 in FIG. 3 via a drive line 214 (not shown in FIG. 3) in FIG. 4, and electrical connection and disconnection are switched between the counter circuit 211 and the vertical signal line 113. The memory circuit 212 functions as a memory that temporarily stores the count value of the counter, and outputs an output signal from the counter circuit 211 of the pixel to the vertical signal line 113.

A switch such as a transistor may be disposed between the quench element 202 and the APD 201 or between the photoelectric conversion unit 102 and the signal processing circuit 103 to switch electrical connection. Similarly, the supply of a drive voltage VH or a drive voltage VL supplied to the photoelectric conversion unit 102 may be electrically switched using a switch such as a transistor.

Figure 5:
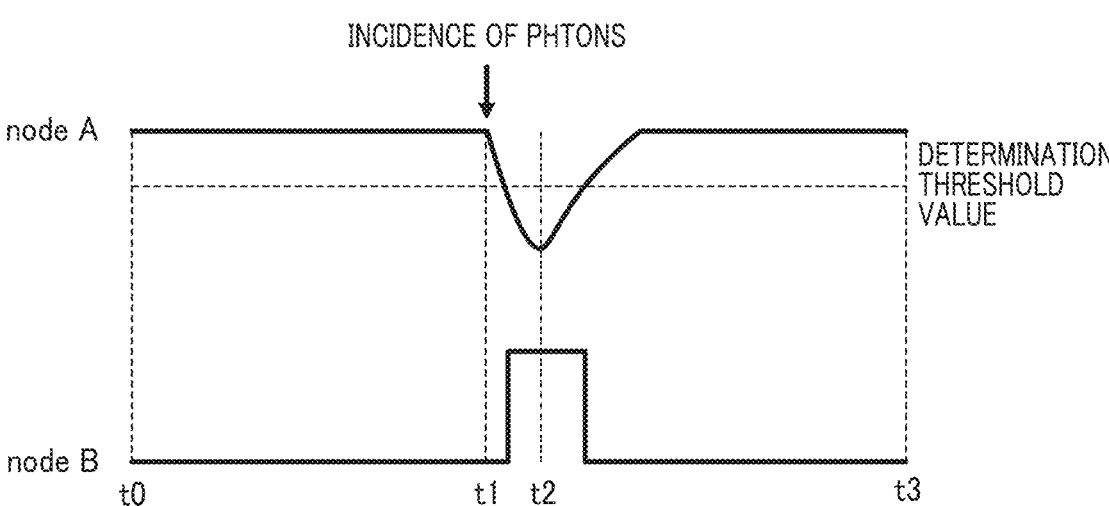
FIG. 5 is a diagram showing a schematic diagram of a relationship between an operation of an APD 201 and an output signal.

FIG. 5 is a diagram showing a schematic diagram of a relationship between the operation of the APD 201 and an output signal. An input side of the waveform shaping unit 210 is assumed to be a nodeA, and an output side thereof is assumed to be a nodeB. A potential difference between VH and VL is applied to the APD 201 between time t0 and time t1. When photons are incident on the APD 201 at time t1, avalanche multiplication occurs in the APD 201, an avalanche multiplication current flows to the quench element 202, and the voltage of the nodeA drops.

When the voltage drop becomes even larger and a potential difference applied to the APD 201 becomes smaller, avalanche multiplication of the APD 201 stops as at time t2, and a voltage level of the nodeA does not drop below a certain value.

Thereafter, a current flows to the nodeA from the voltage VL between time t2 and time t3 to compensate for the voltage drop, and the nodeA is in a static state at its original potential level at time t3. At this time, a portion of the nodeA in which an output waveform exceeds a certain threshold value is shaped by the waveform shaping unit 210, and the nodeB outputs the waveform as a pulse signal.

Figure 6:
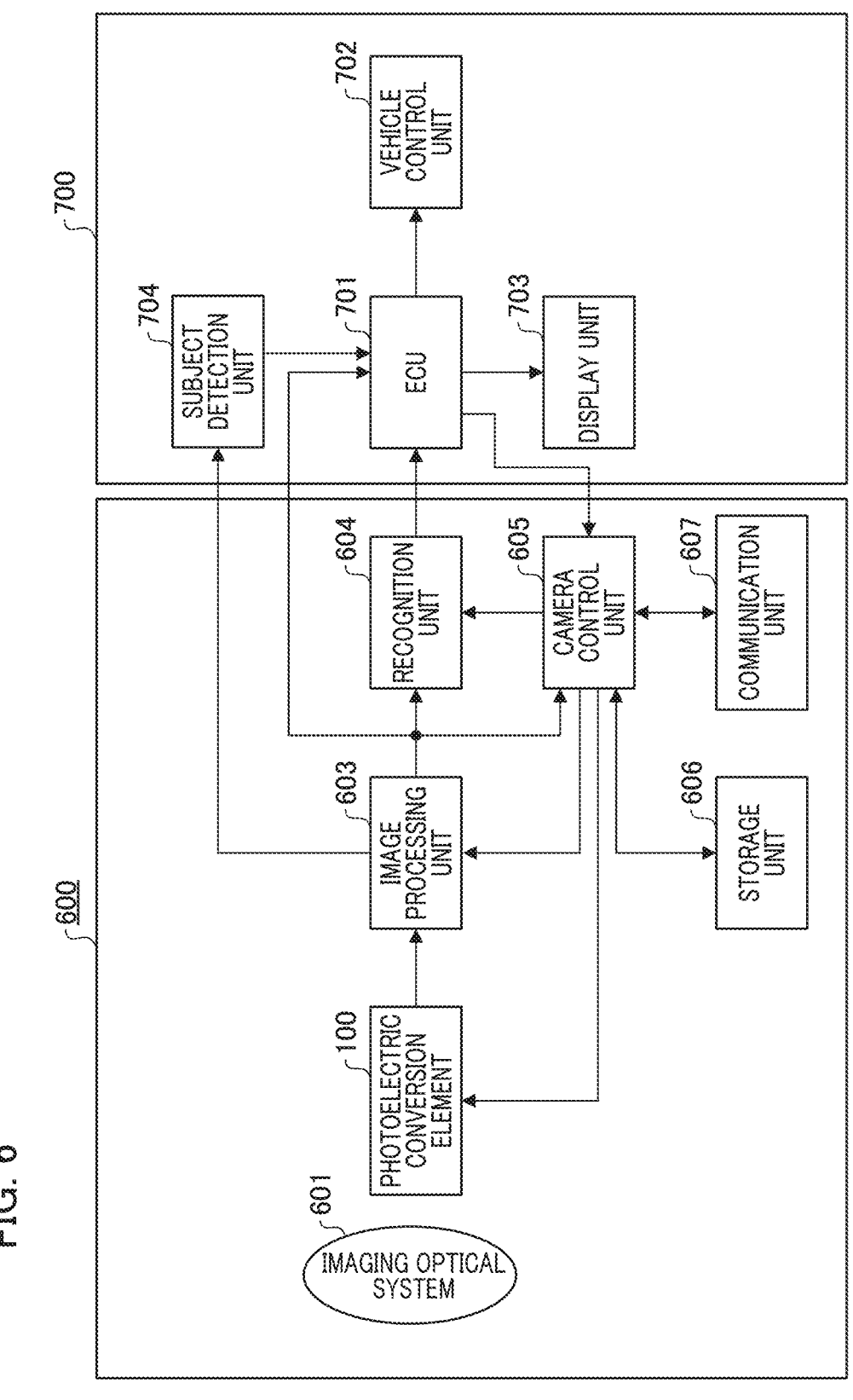
FIG. 6 is a functional block diagram of a photoelectric conversion device 600 and a movable apparatus 700 according to the embodiment.

Next, a photoelectric conversion device 600 and a movable apparatus 700 according to the embodiment will be described. FIG. 6 is a functional block diagram of the photoelectric conversion device 600 and the movable apparatus 700 according to the embodiment. Some of the functional blocks shown in FIG. 6 are implemented by causing a computer (not shown) included in the photoelectric conversion device 600 and the movable apparatus 700 to execute a computer program stored in a memory serving as a storage medium (not shown).

However, some or all of them may be implemented by hardware. As the hardware, a dedicated circuit (ASIC), a processor (reconfigurable processor, DSP), or the like can be used. In addition, each of the functional blocks shown in FIG. 6 may be built in the same housing, and may be constituted by separate devices connected to each other via signal paths.

The photoelectric conversion device 600 includes the photoelectric conversion element 100 described in FIGS. 1 to 5, an imaging optical system 601, an image processing unit 603, a recognition unit 604, a camera control unit 605, a storage unit 606, a communication unit 607, and the like. The photoelectric conversion unit of the photoelectric conversion element 100 is constituted by an avalanche photodiode described in FIGS. 1 to 5 for photoelectrically converting an optical image.

The photoelectric conversion device according to the embodiment is mounted on the movable apparatus 700, and a camera unit including a set of the imaging optical system 601 and the photoelectric conversion element 100 is configured to capture images in at least one direction of, for example, the front, the rear, and the side of the movable apparatus. A plurality of camera units may be provided on the movable apparatus 700.

The image processing unit 603 performs image processing such as black level correction, gamma curve adjustment, noise reduction, digital gain adjustment, demosaic processing, and data compression on an image signal acquired by the photoelectric conversion element 100 to generate a final image signal. When the photoelectric conversion element 100 includes an on-chip color filter such as RGB, it is desirable to perform processing such as white balance correction and color conversion in the image processing unit 603.

In addition, an output of the image processing unit 603 is supplied to the recognition unit 604, an electric control unit (ECU) 701 of the movable apparatus 700, and the camera control unit 605. The recognition unit 604 functions as a recognition processing unit that performs recognition processing based on an image signal generated from a signal generated by the photoelectric conversion unit, recognizes nearby people, vehicles, and the like by performing image recognition based on the image signal, and issues a warning or the like as necessary.

In the present embodiment, the movable apparatus 700 is described using an example of a car, but the movable apparatus may be any one of an airplane, a train, a ship, a drone, an AGV, or a robot as long as the movable apparatus is mobile.

The camera control unit 605 has a built-in CPU as a computer and a memory that stores a computer program, and the CPU executes the computer program stored in the memory to control each unit of the photoelectric conversion device 600.

The camera control unit 605 functions as a control means, and controls the length of an exposure period of each frame of the photoelectric conversion element 100 and the timing of a control signal CLK via, for example, the control pulse generation unit of the photoelectric conversion element 100. Although details will be described later, the camera control unit 605 also controls recognition processing of the recognition unit 604 based on an output from the ECU 701.

The storage unit 606 includes a recording medium such as a memory card or a hard disk, and can store and read image signals. The communication unit 607 includes a wireless or wired interface, outputs a generated image signal to the outside of the photoelectric conversion device 600, and receives various signals from the outside.

The ECU 701 includes a built-in CPU as a computer and a memory that stores a computer program, and the CPU executes the computer program stored in the memory to control each unit of the movable apparatus 700.

A subject detection unit 704 is also connected, and detection information on a subject is input to the ECU 701. Examples of information detected by the subject detection unit 704 include a moving direction of a subject, the type of subject, the amount of change of the subject per unit time, a moving speed of the subject, the position of the subject, and the like from the detection information of the subject.

Further, in FIG. 6, the subject is detected based on an image acquired by the photoelectric conversion device 600, but the subject may be detected based on an image signal output from a sensor other than the photoelectric conversion device 600.

An output of the ECU 701 is supplied to a vehicle control unit 702, a display unit 703, and the camera control unit 605. The vehicle control unit 702 functions as a movement control unit that performs driving, stopping, and direction control of a vehicle that is a movable apparatus based on the output of the ECU 701.

The vehicle control unit 702 is a movement control unit that controls the operation of a movable apparatus based on a recognition result obtained by performing recognition processing using a signal generated during at least a first accumulation period. The first accumulation period will be described later. The display unit 703 functions as a display means, includes a display element such as a liquid crystal device or an organic EL, and is mounted on the movable apparatus 700.

The display unit 703 displays images acquired by the photoelectric conversion element 100 and various information on a traveling state of a vehicle and the like to a driver of the vehicle 700 based on the output of the ECU 701 by using, for example, a GUI.

In addition, the camera control unit 605 receives an input of the subject information detected by the subject detection unit 704 via the ECU 701 and receives an output of a control signal for changing the frequency of image recognition within one full frame period. The change in the frequency of recognition will be described later.

The image processing unit 603, the recognition unit 604, and the like in FIG. 6 may not be mounted on the movable apparatus 700, and may be provided, for example, in an external terminal provided separately from the movable apparatus 700 for remotely controlling the movable apparatus 700 or monitoring the traveling of the movable apparatus.

Figure 7:
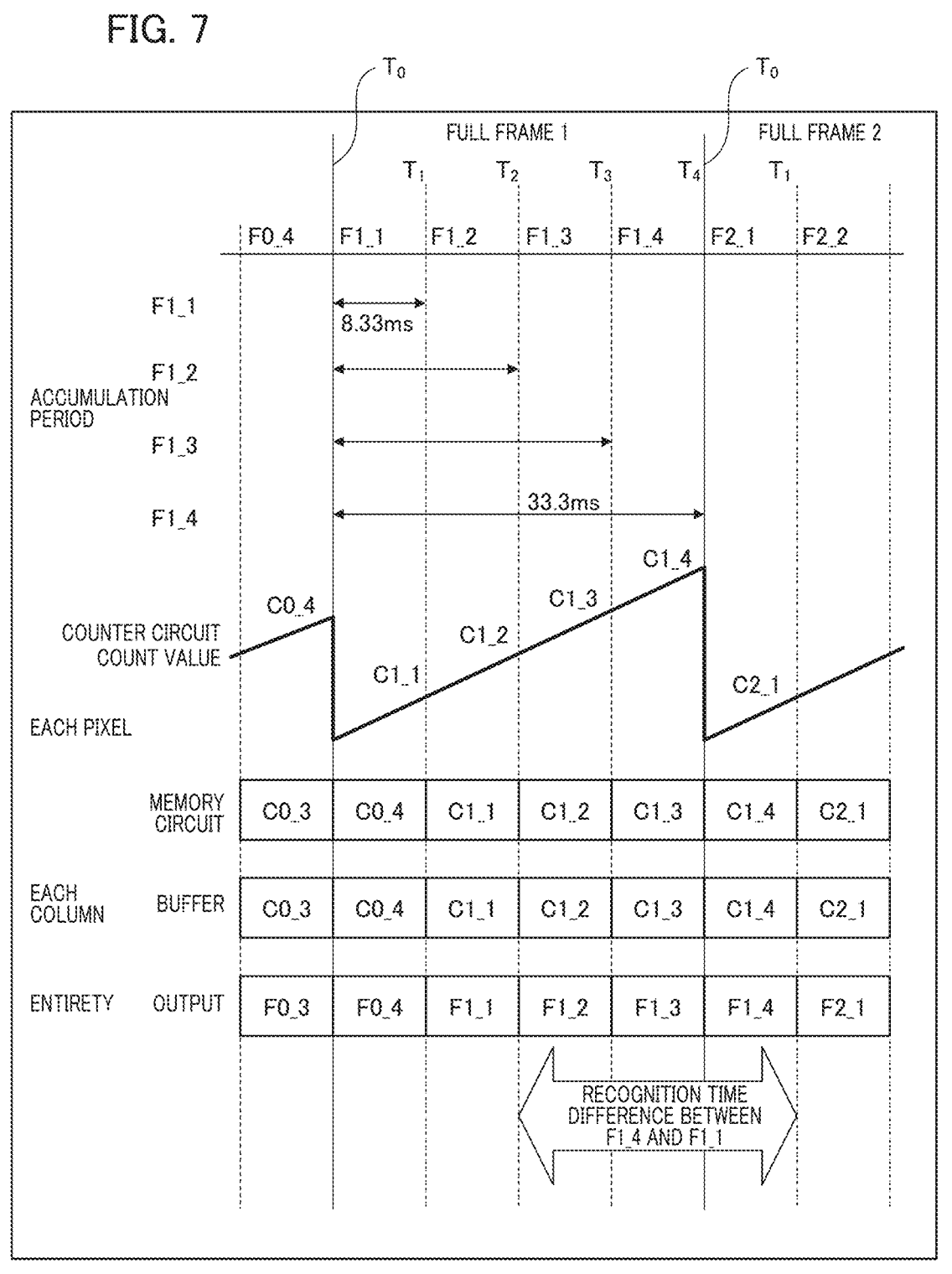

FIG. 7 is a diagram showing a photoelectric conversion method performed by the camera control unit 605 according to the embodiment. In the present embodiment, one frame period having a length of 33.3 ms is referred to as a full frame (or a main frame), and a full frame divided into four is referred to as a frame (or subframe).

In the present embodiment, one full frame period having a length of 33.3 ms is divided into four.

That is, as shown in FIG. 7, a full frame 1 is divided into (8.33 ms) frames 1_1, 1_2, 1_3, and 1_4 of equal periods. In FIG. 7 and the subsequent drawings, frames 0_3, 0_4, 1_1, 1_2, 1_3, 1_4, 2_1, and 2_2 are displayed as F0_3, 0_4, 1_1, 1_2, 1_3, 1_4, 2_1, and 2_2.

The frame 1_1 has an accumulation period from a start time T0 to time T1 of the full frame 1, and the frame 1_2 has an accumulation period from time T0 to time T2. The frame 1_3 has an accumulation period from time T0 to time T3, and the frame 1_4 has an accumulation period from time T0 to time T4. In the present embodiment, for example, the accumulation period from time T0 to time T1 is referred to as a first accumulation period, and the accumulation period from time T0 to time T4 is referred to as a second accumulation period.

Then, the counter circuit 211 is reset at time T0, and count values C1_1, C1_2, C1_3, and C1_4 are obtained from the counter circuit 211 at times T1 to T4.

The count values C1_1, C1_2, C1_3, and C1_4 are temporarily stored in the memory circuit 212. Signals corresponding to one row which are temporarily stored in the memory circuit 212 are sequentially output from the photoelectric conversion element via the buffer of the readout circuit 112.

In this manner, according to the present embodiment, signals accumulated during the period of the frame 1_1 are read out from time T1 to time T2 and are rapidly processed by the recognition unit 604. Thus, image recognition can be performed rapidly. Similarly, signals accumulated during the periods of the frames 1_2, 1_3, and 1_4 are sequentially read out from time T2 to T3, from T3 to T4, and from T4 to T1, respectively, and image recognition can be performed repeatedly.

Figure 8:
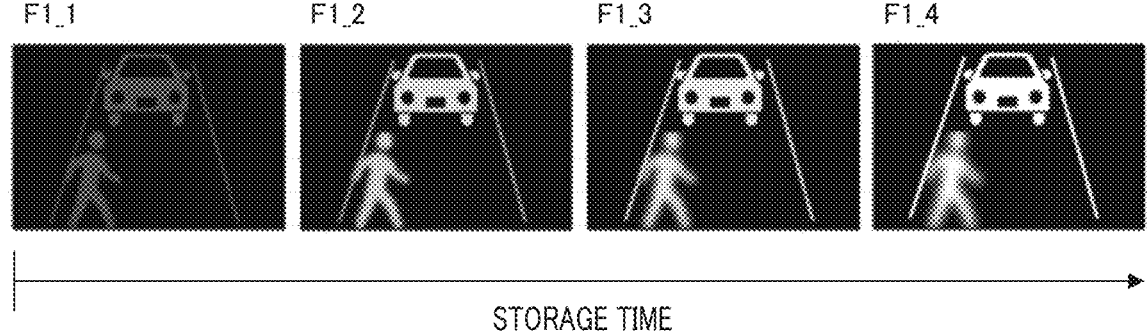
FIG. 8 is a diagram showing an example of an image of a plurality of divided frames.

FIG. 8 is a diagram showing an example of images of a plurality of separate frames. As shown in FIG. 8, an image of a frame 1_1 is dark because an accumulation time is short, but there is little subject blurring of a person jumping out. On the other hand, an accumulation time becomes longer in the order of frames 1_2, 1_3, and 1_4, and thus subject blurring is more likely to occur. Blurring is less likely to occur in a stopped vehicle and white lines, and the longer the accumulation time, the more likely a contrast is to improve.

In this manner, in the present embodiment, one frame period has a first accumulation period and a second accumulation period, the first accumulation period is shorter than the second accumulation period, and a signal generated during the first accumulation period is controlled to be output between the end of the first accumulation period and the end of the second accumulation period.

In the present embodiment, the first and second accumulation periods overlap each other, and the first and second accumulation periods start at the same time. Furthermore, the end of the second accumulation period is a break in a frame period, and the second accumulation period is an integer multiple of the first accumulation period. That is, the end of the second accumulation period coincides with the end of a full frame period.

However, the second accumulation period does not need to be an integer multiple of the first accumulation period, and it is sufficient that the second accumulation period is longer than the first accumulation period and the end of the second accumulation period is later than the end of the first accumulation period.

That is, an image with a short accumulation period and an image with a long accumulation period are created, and a timing at which the short accumulation period ends is set to be earlier than a timing at which the long accumulation period ends. As soon as the short accumulation period ends, the image is output and transmitted to a recognition unit at a rear stage. Then, a subject is recognized based on at least a signal generated during the first accumulation period. The recognition unit 604 as a recognition means recognizes the subject based on a signal generated during at least the first accumulation period.

Thus, while image recognition cannot be performed until one frame elapses in the related art, image recognition can be performed after at least a quarter frame period in the present embodiment, and obstacles and the like can be recognized rapidly, for example, when a movable apparatus is moving at high speed. Thus, it is possible to apply a brake rapidly. Alternatively, it is possible to avoid obstacles early.

The contrast of the image with a long accumulation time can be improved, and thus the image can be used as a display image. That is, the image with a short accumulation time is suitable for rapid image recognition, and the image with a long accumulation time is suitable for a display image. In this manner, the display unit in the present embodiment displays at least a signal generated during the second accumulation period as an image. In the present embodiment, the recognition processing unit further recognizes a subject based on a signal generated during the second accumulation period.

In addition, since the APD is used in the present embodiment, accumulation periods can overlap each other because charges accumulated by reading-out do not deteriorate unlike a CMOS sensor. In addition, since there is no readout noise, the original signal does not deteriorate no matter how many times reading-out is performed by one accumulation.

Figure 9:
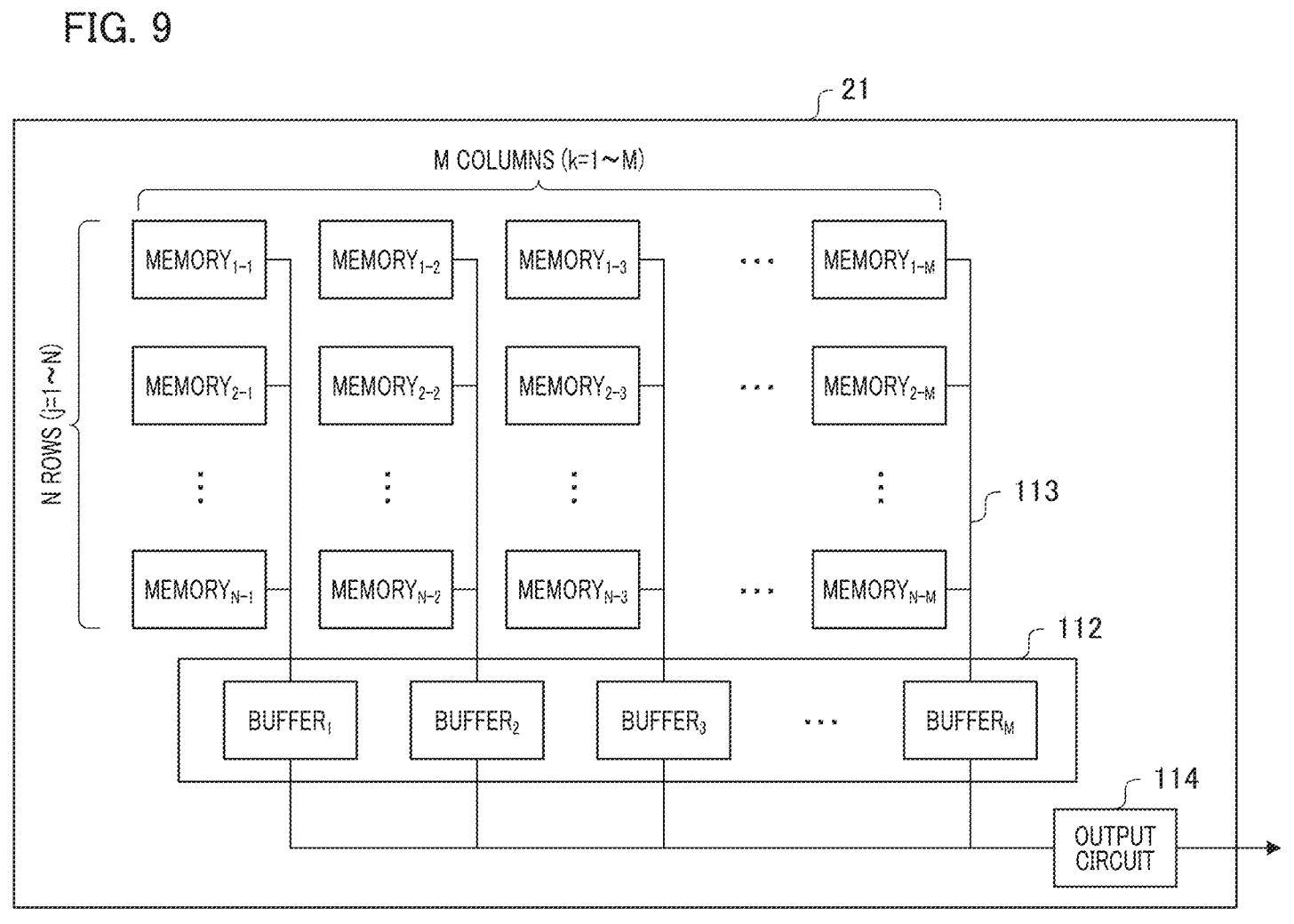

FIG. 9 is a diagram showing a relationship between the memory circuits and the buffers in the embodiment. In FIG. 9, the memory circuits 212 in the signal processing circuit 103 shown in FIG. 3 are arranged in N rows and M columns, and the memory circuits are shown as a memory 1-1 to a memory N-M. In addition, a buffer 1 to a buffer M in FIG. 9 indicate buffers included in the readout circuit 112 in FIG. 3. The output circuit 114 in FIG. 9 corresponds to the output circuit 114 in FIG. 3.

Figure 10:
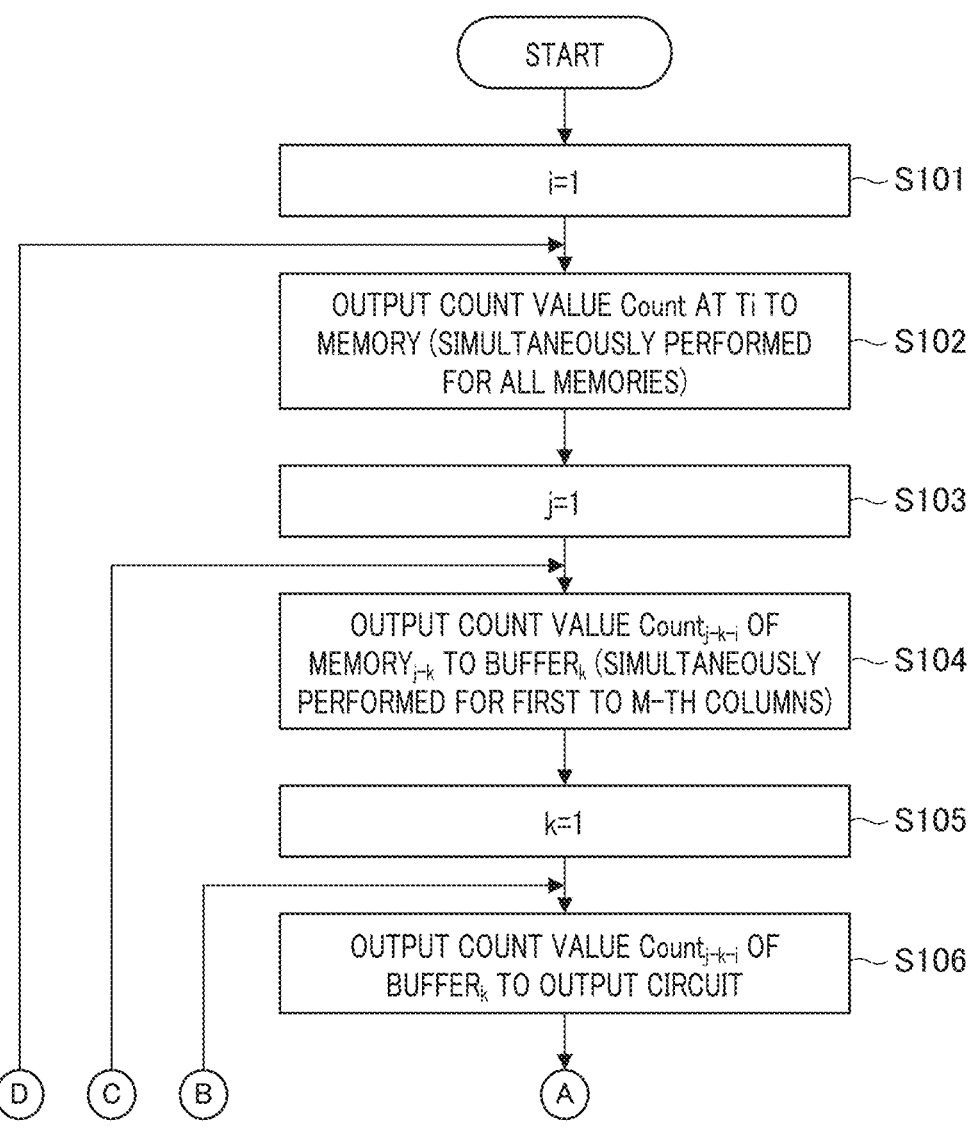
FIG. 10 is a flowchart showing details of an example of driving of a photoelectric conversion element in the embodiment.
Figure 11:
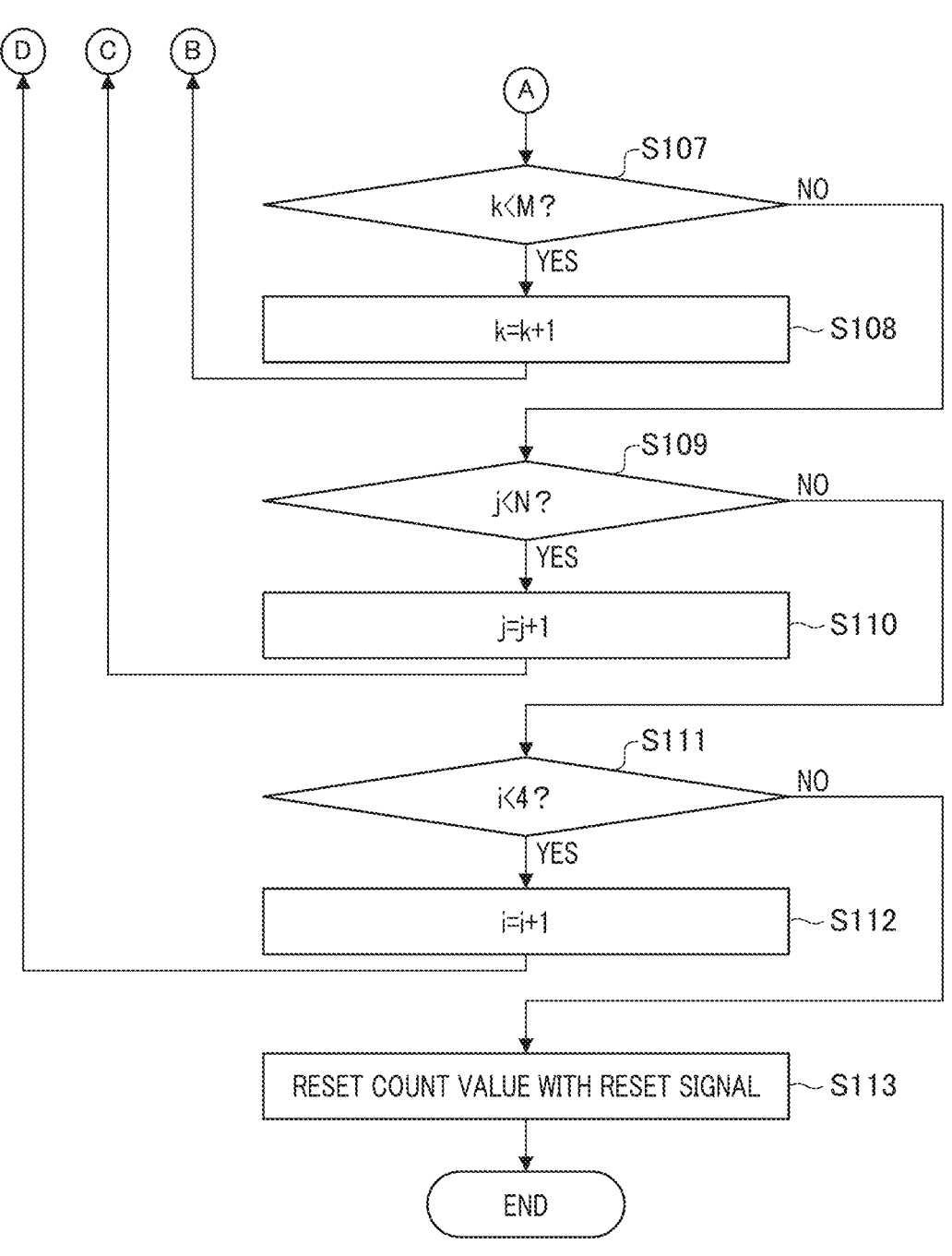
FIG. 11 is a continuation of the flowchart of FIG. 10.

FIG. 10 is a flowchart showing details of an example of driving of the photoelectric conversion element in the embodiment, and FIG. 11 is a continuation of the flowchart in FIG. 10. Operations of steps in the flowcharts in FIG. 10 and FIG. 11 are performed sequentially by causing a CPU or the like as a computer in the camera control unit 605 to execute a computer program stored in the memory.

In step S101 of FIG. 10, the CPU in the camera control unit 605 sets i=1, and outputs a count value Count of the counter circuit 211 at time Ti to the memory circuit 212 in step S102. At this time, count values are simultaneously output to all memory circuits. This operation corresponds to the operation at time T1 in FIG. 7.

Next, in step S103, the CPU in the camera control unit 605 sets j=1, and outputs a count value Count(j-k-i) of a memory circuit j-k in FIG. 9 to the buffer in step S104. At this time, count values are simultaneously output to the buffers in columns 1 to M. This operation means an operation of taking count values in a first row in FIG. 9 into the buffers.

Next, in step S105, the CPU in the camera control unit 605 sets k=1, and outputs a count value Count(j-k-i) of a buffer k to the output circuit 114 in step S106. This operation corresponds to an operation of reading out a signal in a buffer in the leftmost column in FIG. 9 from the output circuit.

Next, the processing proceeds to step S107 in FIG. 11 via A, and the CPU in the camera control unit 605 determines whether k<M in step S107. When a determination result is Yes, the CPU sets k=k+1 and increments k by 1 in step S108. Thereafter, the processing returns to step S106 via B, and the operation of step S106 is performed. This operation corresponds to an operation of reading out a signal of a buffer in the second column from the left in FIG. 9 from the output circuit.

When a determination result in step S107 is No, that is, when k=M, it means that reading-out of a signal of a buffer in an M-th column in FIG. 9 from the output circuit has ended. Next, the processing proceeds to step S109, and the CPU in the camera control unit 605 determines whether j<N.

When a determination result in step S109 is Yes, the CPU in the camera control unit 605 sets j=J+1 in step S110, increments j by 1, and returns to step S104 via C. This corresponds to an operation for starting reading-out of the next row.

When a determination result in step S109 is No, it means that reading-out of all rows has ended. Thus, the processing proceeds to step S111, and the CPU in the camera control unit 605 determines whether j<4. When a determination result in step S111 is Yes, the processing proceeds to step S112, and the CPU in the camera control unit 605 sets i=i+1, increments i by 1, and returns to step S102 via D. This operation corresponds to an operation of starting reading-out at the next time T2.

When a determination result in step S111 is No, it means that reading-out at time T4 has been completed. Thus, the processing proceeds to step S113, and the CPU in the camera control unit 605 resets the counter circuit 211 with a reset signal. This operation corresponds to a reset operation of the counter circuit 211 at time T4 in FIG. 7. In this manner, signals stored in the photoelectric conversion element 100 can be read out sequentially.

Next, a method of changing the frequency of image recognition executed by the recognition unit 604 based on subject information detected by the subject detection unit 704 in the present embodiment will be described with reference to FIGS. 12 and 13. The subject information includes information such as a moving direction of a subject.

Figure 12:
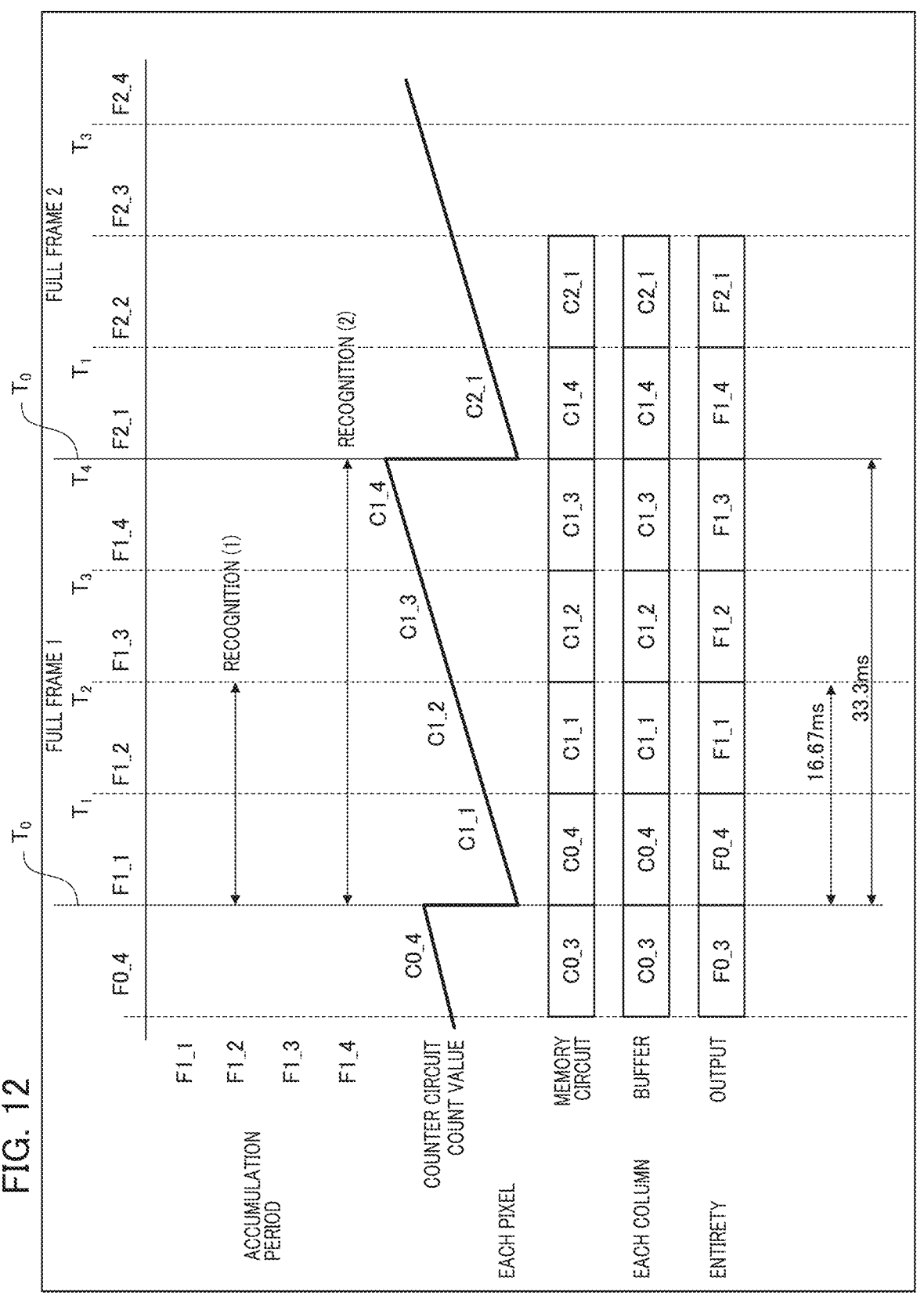
FIG. 12 is a diagram showing the frequency of recognition during normal driving in the embodiment.

FIG. 12 is a diagram showing the frequency of recognition during normal driving in the embodiment, the frequency of recognition being a frequency when a moving direction of a subject is a direction away from a moving direction of a host vehicle. As in FIG. 7, a full frame 1 is divided into frames 1_1, 1_2, 1_3, and 1_4 of equal periods (8.33 ms).

At this time, the ECU 701 determines whether the subject is moving away from a moving direction of a host vehicle based on position information and moving direction information of the subject detected by the subject detection unit 704. When it is determined that the host vehicle is moving away from the moving direction of the host vehicle, the ECU 701 notifies the camera control unit 605 to read signals in the accumulation periods of the frames 1_2 and 1_4 and perform image recognition twice.

Regarding the moving direction of the host vehicle, a road may be detected from a video signal acquired by the photoelectric conversion device 600, the moving direction of the host vehicle may be determined based on the detection information, or the moving direction of the host vehicle may be determined based on a road detection result obtained from the video signal and a steering angle of the host vehicle. The moving direction of the host vehicle may also be determined based on map information and GPS information obtained from a car navigation system or the like.

In the present embodiment, even when the frequency of image recognition is reduced, image recognition can be performed every ½ full frame period, and thus obstacles and the like can be recognized rapidly when a movable apparatus is moving. Thus, it is possible to apply a brake rapidly or avoid an obstacle early.

Figure 13:
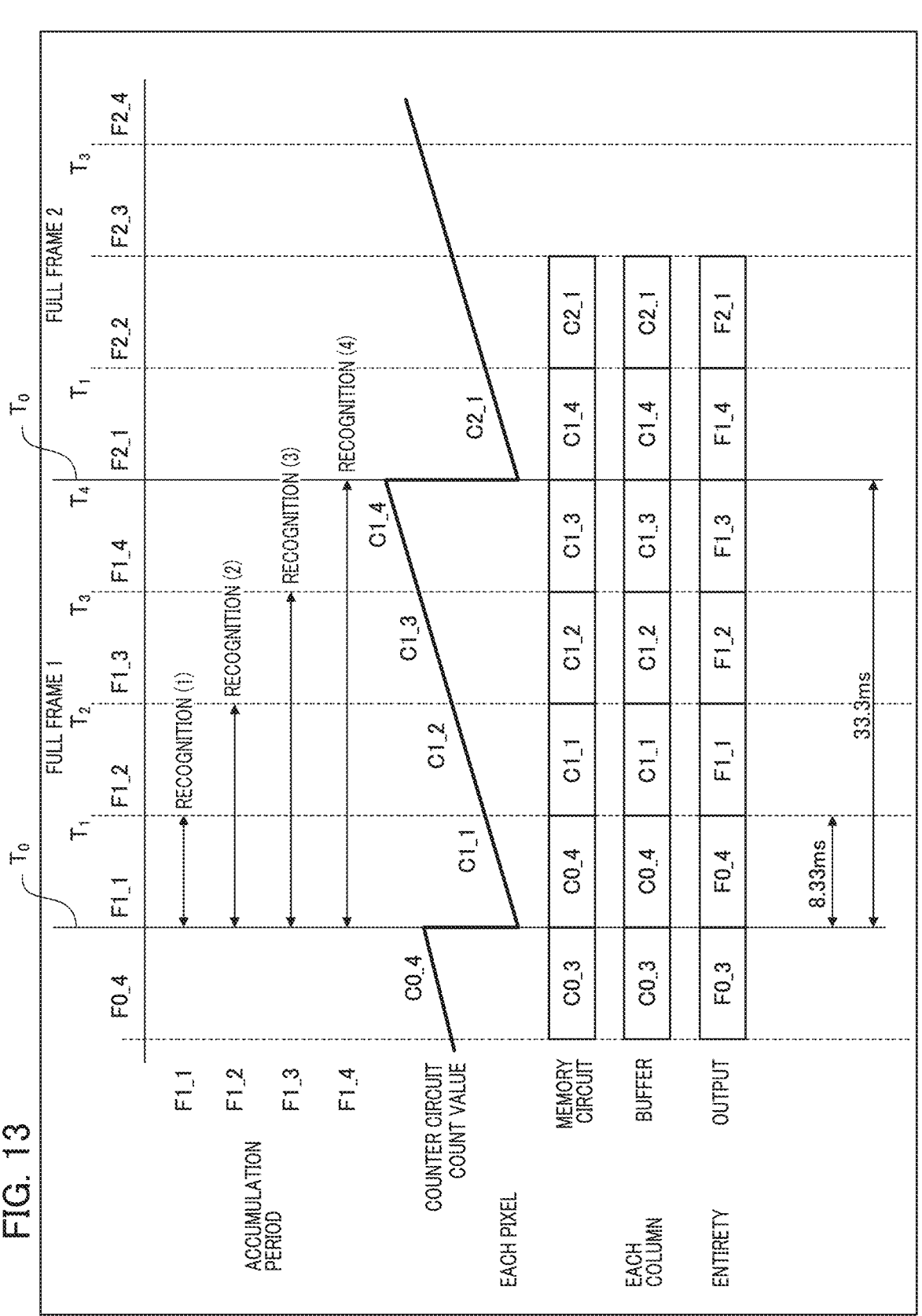
FIG. 13 is a diagram showing the frequency of recognition when a subject approaching in a moving direction of a host vehicle is detected in the embodiment.

Next, FIG. 13 is a diagram showing the frequency of recognition when a subject approaching in a moving direction of a host vehicle is detected in the embodiment, the frequency of recognition being the frequency of recognition when a moving direction of the subject is a direction approaching the moving direction of the host vehicle. In this case, as in FIG. 7, a full frame 1 is divided into frames 1_1, 1_2, 1_3, and 1_4 of equal periods (8.33 ms).

In the present embodiment, when the moving direction of the subject detected by the subject detection unit 704 is a direction approaching the moving direction of the host vehicle, signals in the accumulation periods of the frame 1_1, the frame 1_2, the frame 1_3, and the frame 1_4 are read out, respectively. The ECU 701 then notifies the camera control unit 605 to perform image recognition four times.

In this manner, in the present embodiment, intervals of timings at which the recognition processing unit starts recognition are set to be equal. The recognition processing unit then performs the recognition processing based on signals read out for each first accumulation period within a second accumulation period.

While image recognition cannot be performed until one full frame period elapses in the related art, image recognition can be performed by reading out signals a plurality of times every ¼ frame period in the present embodiment, and a more accurate determination can be performed rapidly with respect to the movement of an obstacle or the like. Alternatively, it is possible to avoid an obstacle early.

Figure 14:
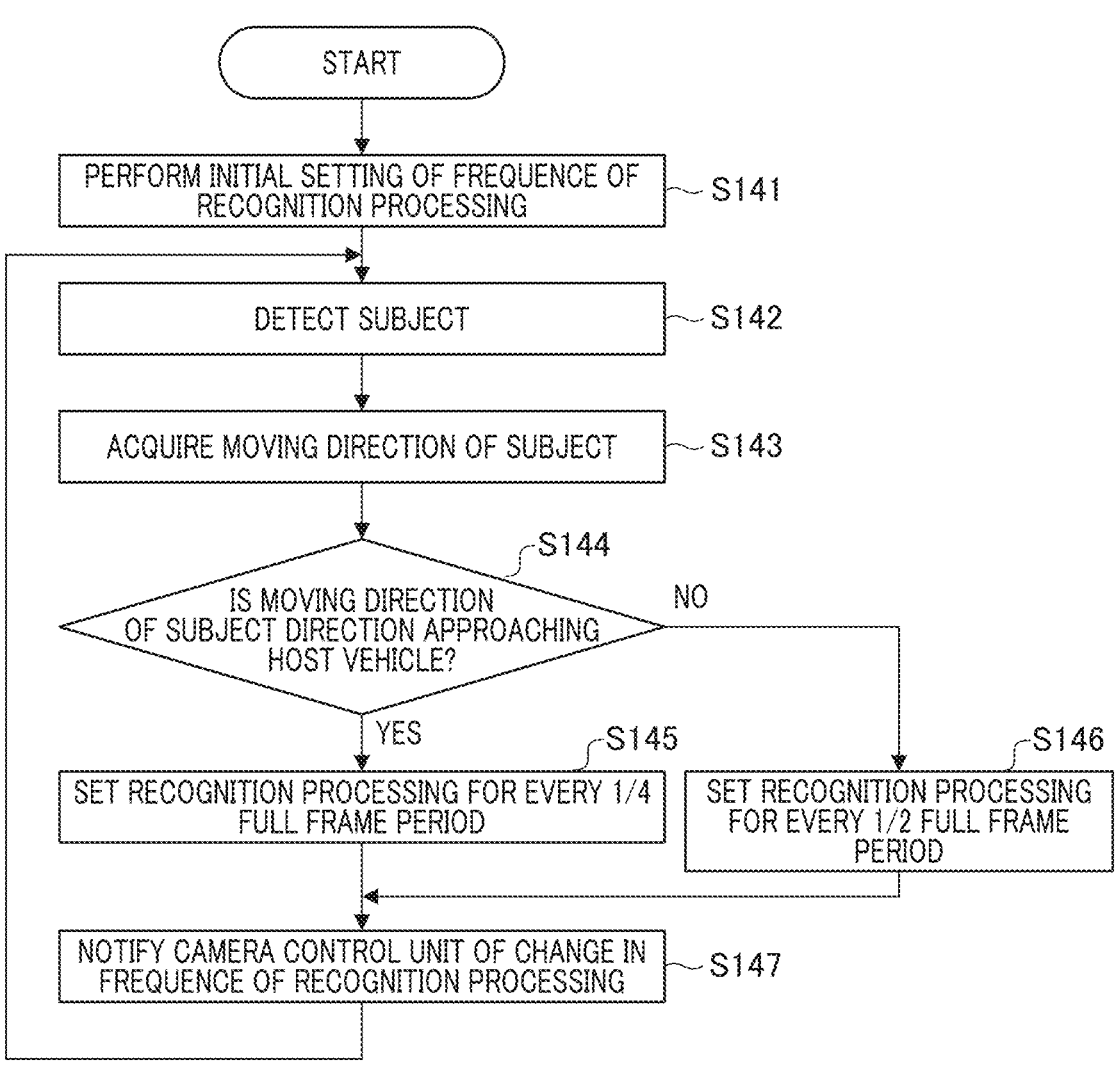
FIG. 14 is a flowchart showing for explaining a change in the frequency of recognition when a subject approaching in a moving direction of a host vehicle is detected in the embodiment.

FIG. 14 is a flowchart showing a change in the frequency of recognition when a subject approaching in a moving direction of a host vehicle in the embodiment is detected. Operation of steps in the flowchart in FIG. 14 are performed sequentially by causing a CPU or the like as a computer in the ECU 701 to execute a computer program stored in the memory.

In step S141 of FIG. 14, the CPU of the ECU performs an initial setting of the frequency of recognition processing. At first, before a subject is detected, the frequency of recognition processing is set to the initial setting of every ½ full frame period. When the initialization of the recognition processing is completed, the processing proceeds to step S142.

Next, in step S142, the CPU of the ECU detects a subject using the subject detection unit 704, acquires the output by ECU 701, and proceeds to step S143.

Next, in step S143, the CPU of the ECU calculates a moving direction of the subject based on the output of the subject detection unit 704, and proceeds to step S144.

Next, in step S144, the CPU of the ECU determines whether the moving direction of the subject is a direction approaching the moving direction of the host vehicle, and performs the result. When the moving direction of the subject is a direction approaching the moving direction of the host vehicle (Yes), the processing proceeds to step S145, and when the moving direction of the subject is a direction away from the moving direction of the host vehicle (No), the processing proceeds to step S146.

When the processing proceeds to step S145, the CPU of the ECU sets recognition processing to be performed every ¼ full frame period so that image recognition is performed four times within one full frame period. After the recognition processing within one frame period is set for every ¼ full frame period, the processing proceeds to step S147.

In step S147, the CPU of the ECU causes the ECU 701 to notify the camera control unit 605 of the frequency of recognition of the recognition processing within one full frame period set in step S145, and proceeds to step S142 to continue the processing. The camera control unit 605, which has been notified of by the CPU of the ECU 701, outputs a control signal for changing the frequency of recognition to the recognition unit 604.

Next, processing when the processing proceeds to step S146 in step S144 will be described. When the processing proceeds to step S146, the CPU of the ECU sets recognition processing to be performed every ½ full frame period so that image recognition is performed twice within one frame period.

Then, in step S147, the CPU of the ECU causes the ECU 701 to notify the camera control unit 605 of the frequency of recognition of the recognition processing within one full frame period set in step S146, and proceeds to step S142 to continue the processing.

That is, when a subject is moving away, support by the image recognition is minimized, a warning or the like by the recognition processing is not issued frequently, and a processing load is reduced. In addition, when a subject is approaching, the frequency of image recognition is increased to be able to avoid an accident.

In this manner, in the recognition unit 604 according to the present embodiment, the frequency of image recognition within one full frame period can be changed based on conditions of a subject (subject information), thereby optimizing the accuracy of recognition of the subject.

In the present embodiment, description has been given of a case where the frequency of image recognition is changed when a predetermined switching condition is established based on a moving direction of a subject indicating whether the subject is approaching, as subject information, but the subject information is not limited thereto.

For example, as an example of subject information for changing the frequency of image recognition when a car is traveling, a moving speed of a subject may be detected and a switching condition may be changed in accordance with the moving speed of the subject. For example, control may be performed such that the frequency of recognition is increased as the moving speed of the subject becomes higher. Alternatively, the frequency of recognition may be changed based on both the moving speed and direction of the subject. For example, control may be performed such that the frequency of recognition is increased as a relative approaching speed of the subject to the host vehicle becomes higher.

Furthermore, in the present embodiment, there is no limitation on the type of subject, but a subject to be detected may be limited to animals, cars, bicycles, people, and the like, and a switching condition may be changed depending on the type of subject.

That is, for example, control may be performed such that the frequency of recognition when a detected subject is a person or a vehicle carrying a person is higher than the frequency of recognition when a detected subject is an animal. In this manner, subject information includes at least one of a moving speed, moving direction, and type of the subject.

In addition, for example, in the above-described embodiment, accumulation is performed for a ¼ full frame period at the shortest, but accumulation may be performed for a 1/N full frame period (N is an integer). Even when a read-out cycle is set to every 1/N full frame period, a substantial accumulation period may be set to be shorter than a 1/N full frame period by resetting the counter circuit midway during the 1/N full frame period in accordance with the brightness of the subject, the accuracy of image recognition, and the like.

Alternatively, the counter circuit may be reset once at time T1 in FIG. 7. Thereby, count values read out at the subsequent times T2, T3, T4, and the like may be adjusted.

While the present invention has been described with reference to exemplary embodiments, it is to be understood that the invention is not limited to the disclosed exemplary embodiments. The scope of the following claims is to be accorded the broadest interpretation to encompass all such modifications and equivalent structures and functions.

In addition, as a part or the whole of the control according to the embodiments, a computer program realizing the function of the embodiments described above may be supplied to the photoelectric conversion device and the like through a network or various storage media. Then, a computer (or a CPU, an MPU, or the like) of the photoelectric conversion device and the like may be configured to read and execute the program. In such a case, the program and the storage medium storing the program configure the present invention.

In addition, the present invention includes those realized using at least one processor or circuit configured to perform functions of the embodiments explained above. For example, a plurality of processors may be used for distribution processing to perform functions of the embodiments explained above.

This application claims the benefit of priority from Japanese Patent Application No. 2023-147812, filed on Sep. 12, 2023, which is hereby incorporated by reference herein in its entirety.

What is claimed is:

1. A photoelectric conversion device comprising:
a plurality of pixels each including a photoelectric conversion unit that emits pulses corresponding to photons, a counter that counts the number of the pulses, and a memory that stores a count value of the counter;
one or more memories storing instructions; and
one or more processors executing the instructions to
generate a signal based on a difference between a count value of the counter at the start of an accumulation period and a count value at the end of the accumulation period,
perform control so that a signal generated in a first accumulation period is output between the end of the first accumulation period and the end of a second accumulation period, wherein one full frame period includes the first accumulation period and the second accumulation period longer than the first accumulation period,
perform recognition processing based on an image signal, and
change a frequency of recognition within the one full frame period based on subject information in the recognition processing.

2. The photoelectric conversion device according to claim 1, wherein intervals of timings at which the recognition processing unit starts recognition are set to be equal.

3. The photoelectric conversion device according to claim 1, wherein the first accumulation period and the second accumulation period overlap each other.

4. The photoelectric conversion device according to claim 1, wherein the first accumulation period and the second accumulation period start simultaneously.

5. The photoelectric conversion device according to claim 1, wherein the end of the second accumulation period coincides with the end of the full frame period.

6. The photoelectric conversion device according to claim 1, wherein the one or more processors further execute the instructions to recognize a subject based on signals generated at least in the first accumulation period in the recognition processing.

7. The photoelectric conversion device according to claim 6, wherein the one or more processors further execute the instructions to further recognize the subject based on signals generated in the second accumulation period in the recognition processing.

8. The photoelectric conversion device according to claim 1, wherein the one or more processors further execute the instructions to perform the recognition processing based on signals read out for each first accumulation period within the second accumulation period in the recognition processing.

9. The photoelectric conversion device according to claim 1, further comprising a display unit displaying signals generated at least in the second accumulation period as an image.

10. The photoelectric conversion device according to claim 1, wherein the photoelectric conversion unit includes an avalanche photodiode.

11. The photoelectric conversion device according to claim 1, wherein the subject information includes a moving direction of a subject.

12. The photoelectric conversion device according to claim 1, wherein the subject information includes a moving speed of a subject.

13. The photoelectric conversion device according to claim 1, wherein the subject information includes a type of subject.

14. A movable apparatus comprising:
a plurality of pixels each including a photoelectric conversion unit that emits pulses corresponding to photons, a counter that counts the number of the pulses, and a memory that stores a count value of the counter;
one or more memories storing instructions; and
one or more processors executing the instructions to
generate a signal based on a difference between a count value of the counter at the start of an accumulation period and a count value at the end of the accumulation period,
perform control so that a signal generated in a first accumulation period is output between the end of the first accumulation period and the end of a second accumulation period, wherein one full frame period includes the first accumulation period and the second accumulation period longer than the first accumulation period,
perform recognition processing based on an image signal, and
change a frequency of recognition within the one full frame period based on subject information in the recognition processing, wherein
an operation of the movable apparatus is controlled based on a recognition result of the recognition processing.

15. A method of controlling a photoelectric conversion device including a plurality of pixels each including a photoelectric conversion unit that emits pulses corresponding to photons, a counter that counts the number of the pulses, and a memory that stores a count value of the counter, the method comprising:
generating a signal based on a difference between a count value of the counter at the start of an accumulation period and a count value at the end of the accumulation period;
performing control so that a signal generated in a first accumulation period is output between the end of the first accumulation period and the end of a second accumulation period, and one full frame period includes the first accumulation period and the second accumulation period longer than the first accumulation period;
performing recognition processing based on an image signal; and
changing a frequency of recognition within the one full frame period based on subject information.

16. A non-transitory computer-readable storage medium configured to store a computer program for a photoelectric conversion device comprising instructions for executing following processes,
wherein the photoelectric conversion device includes a plurality of pixels each including a photoelectric conversion unit that emits pulses corresponding to photons, a counter that counts the number of the pulses, and a memory that stores a count value of the counter;
the computer program comprising instructions for executing following processes:

generating a signal based on a difference between a count value of the counter at the start of an accumulation period and a count value at the end of the accumulation period;

performing control so that a signal generated in a first accumulation period is output between the end of the first accumulation period and the end of a second accumulation period, and one full frame period includes the first accumulation period and the second accumulation period longer than the first accumulation period;

performing recognition processing based on an image signal; and changing a frequency of recognition within the one full frame period based on subject information.

* * * * *